United States Patent
Chopra et al.

(10) Patent No.: US 10,776,041 B1
(45) Date of Patent: Sep. 15, 2020

(54) SYSTEM AND METHOD FOR SCALABLE BACKUP SEARCH

(71) Applicant: EMC IP Holding Company LLC, Hopkinton, MA (US)

(72) Inventors: Shelesh Chopra, Bangalore (IN); Sunil Yadav, Bangalore (IN); Jayashree B. Radha, Bangalore (IN); Aaditya Rakesh Bansal, Bangalore (IN); Manish Sharma, Bangalore (IN); Sneha Yadav, Bangalore (IN); Amit Jain, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/412,402

(22) Filed: May 14, 2019

(51) Int. Cl.
*G06F 3/12* (2006.01)
*G06F 3/06* (2006.01)
*G06F 9/455* (2018.01)
*G06F 16/245* (2019.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/45558* (2013.01); *G06F 16/245* (2019.01); *G06F 2009/45562* (2013.01); *G06F 2009/45583* (2013.01)

(58) Field of Classification Search
CPC ............................... G06F 3/065; G06F 3/0619
USPC ........................................................ 711/162
See application file for complete search history.

(56) References Cited

U.S. PATENT DOCUMENTS

| | | | |
|---|---|---|---|
| 8,554,918 B1 | 10/2013 | Douglis | |
| 9,256,725 B2 | 2/2016 | Oprea et al. | |
| 9,311,375 B1 * | 4/2016 | Naik | G06F 16/275 |
| 9,740,577 B1 | 8/2017 | Chakraborty et al. | |
| 9,977,704 B1 | 5/2018 | Chopra et al. | |
| 10,216,583 B1 | 2/2019 | Krinke | |
| 2007/0239755 A1 | 10/2007 | Mahoney | |
| 2010/0122248 A1 * | 5/2010 | Robinson | G06F 9/5077 |
| | | | 718/1 |
| 2018/0225311 A1 | 8/2018 | Bandopadhyay et al. | |
| 2019/0286530 A1 | 9/2019 | Talley et al. | |
| 2020/0007620 A1 | 1/2020 | Das et al. | |
| 2020/0183652 A1 | 6/2020 | Krebs et al. | |

* cited by examiner

*Primary Examiner* — Jae U Yu
(74) *Attorney, Agent, or Firm* — Chamberlain, Hrdlicka, White, Williams & Aughtry

(57) ABSTRACT

A remote agent for providing data protection services to virtual machines includes persistent storage for storing a backup data catalog and a backup manager. The backup manager instantiates a backup agent in a new virtual machine of the virtual machines; obtains a backup data package associated with the new virtual machine using the backup agent, the backup data package specifies assets of the new virtual machine; generates a backup data processing schema for the new virtual machine based on the backup data package; initiates a backup generation for the new virtual machine to store a backup for the new virtual machine in backup storage; processes, using the backup agent, metadata associated with the backup using backup data processing schema to obtain backup data processing schema compliant catalog data; and provides search services for the backup using the backup data processing schema compliant catalog data and the backup data catalog.

20 Claims, 16 Drawing Sheets

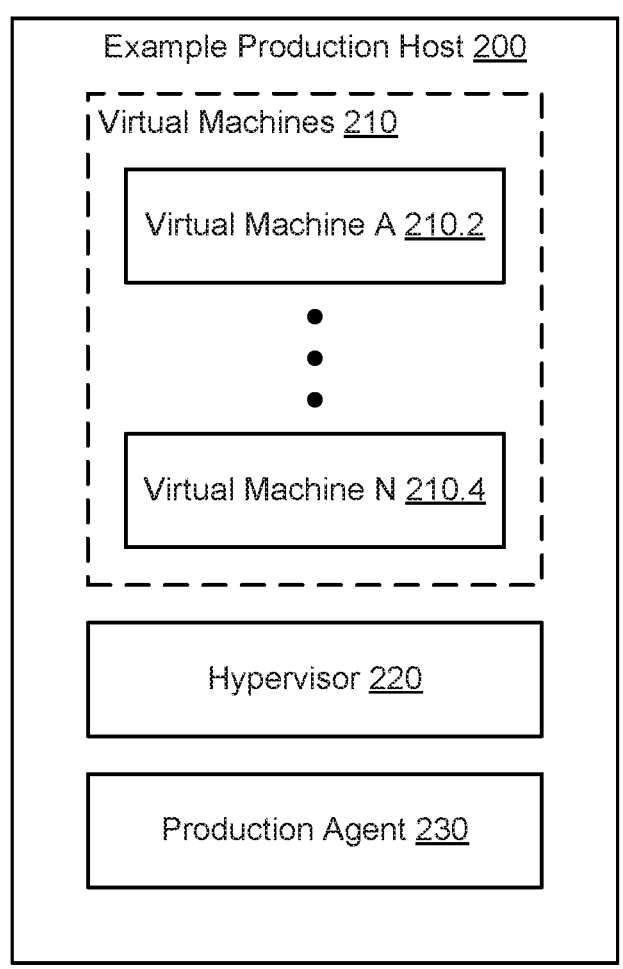
FIG. 2.1

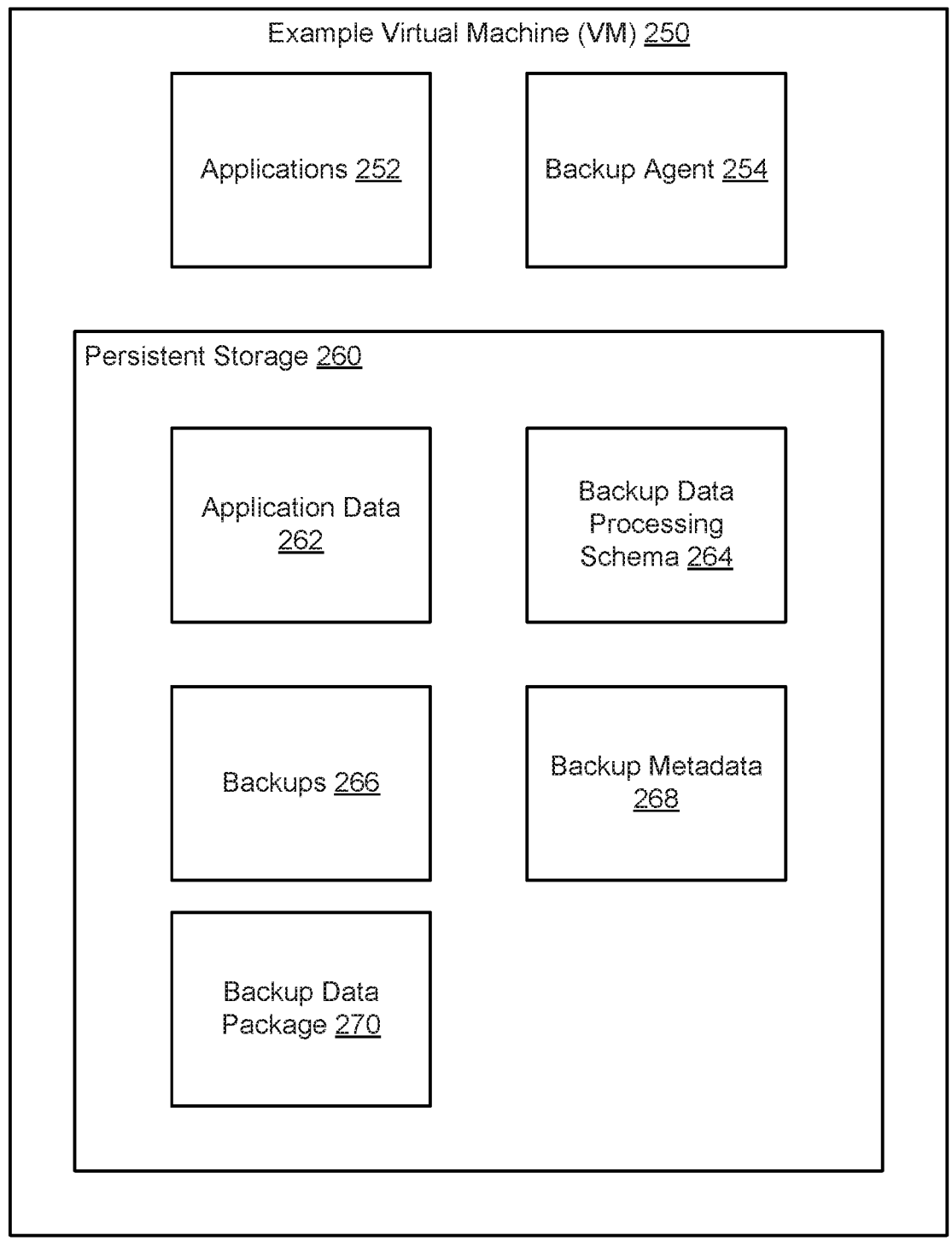
FIG. 2.2

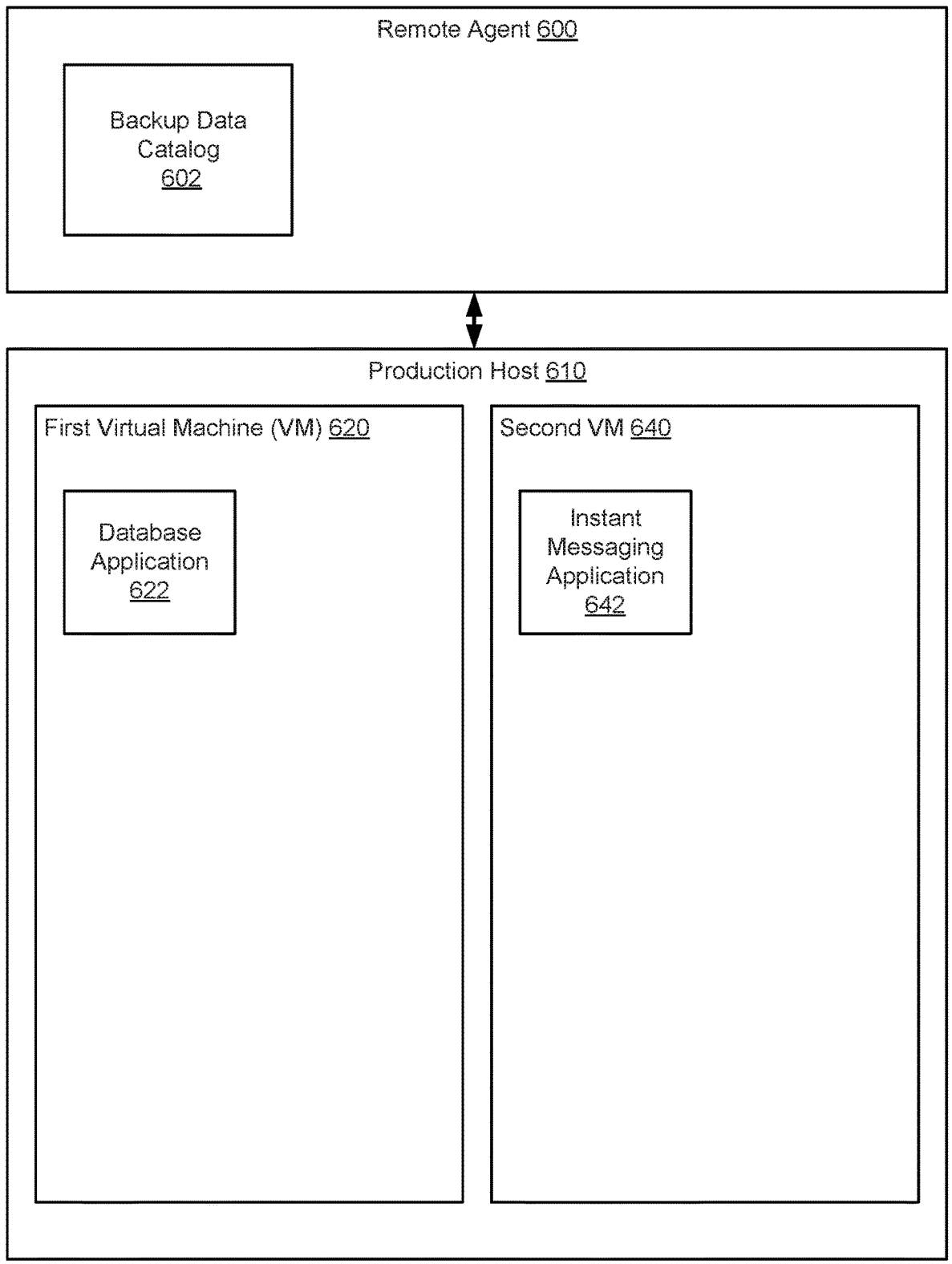
FIG. 6.1

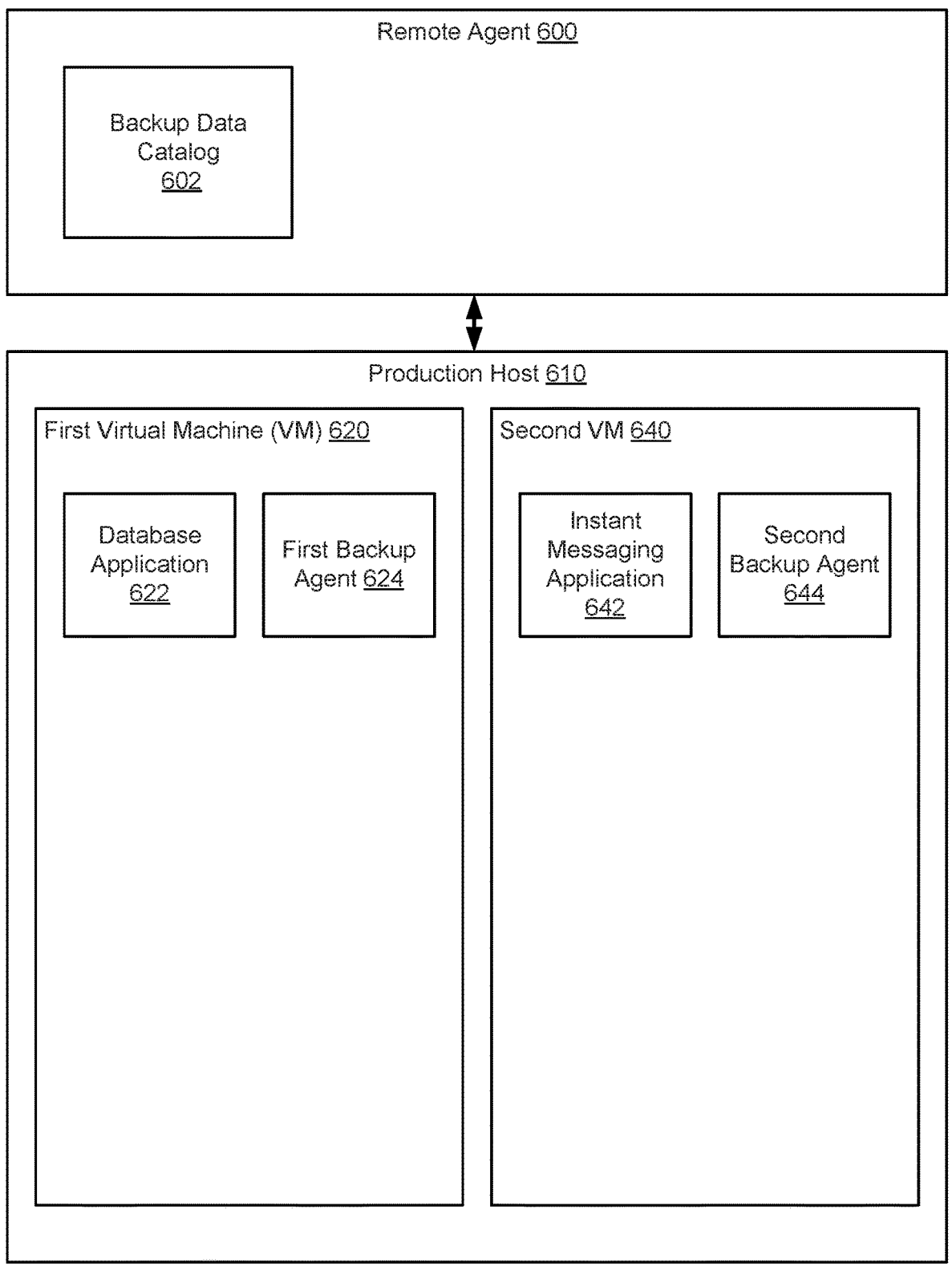
FIG. 6.2

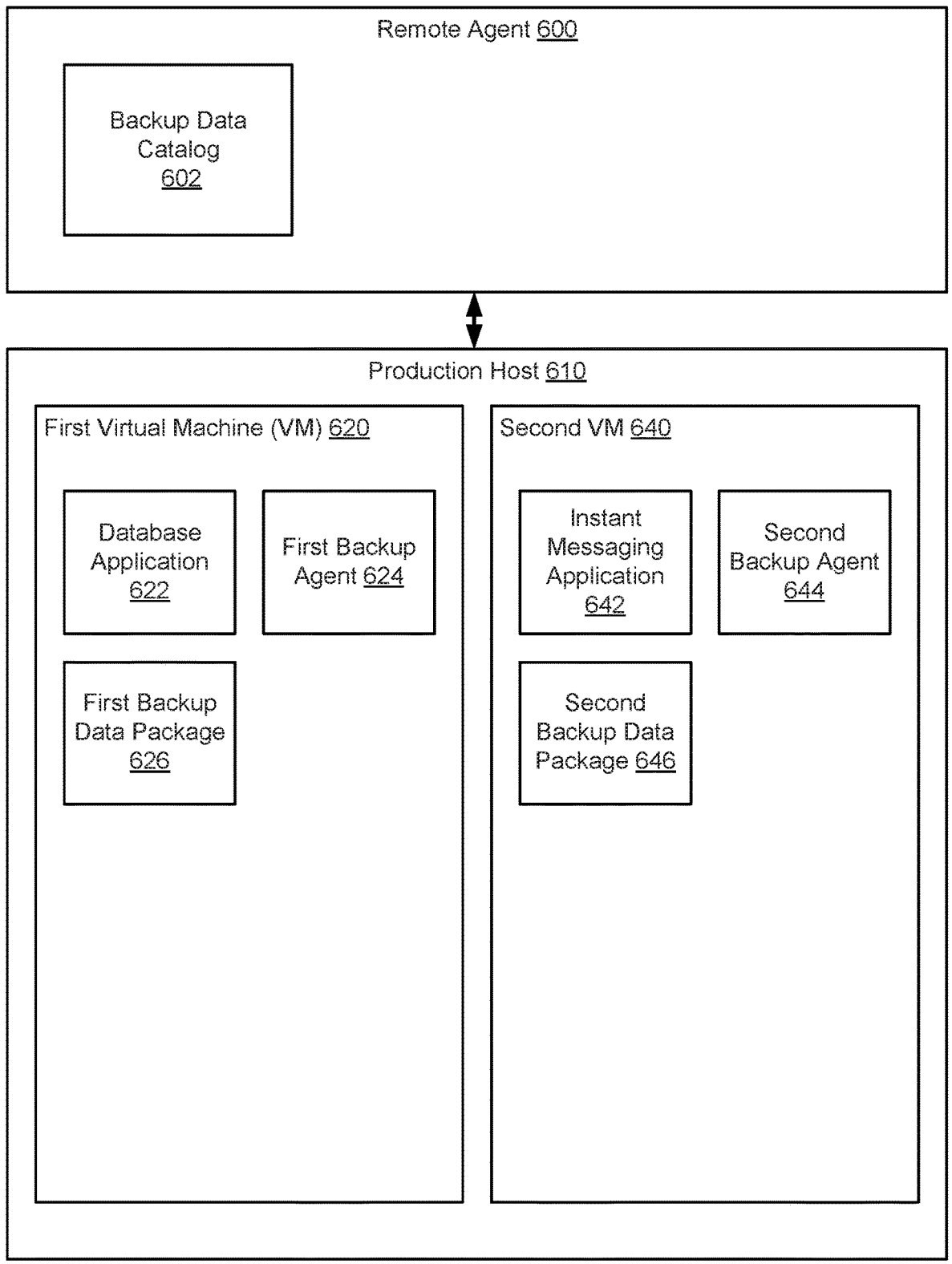
FIG. 6.3

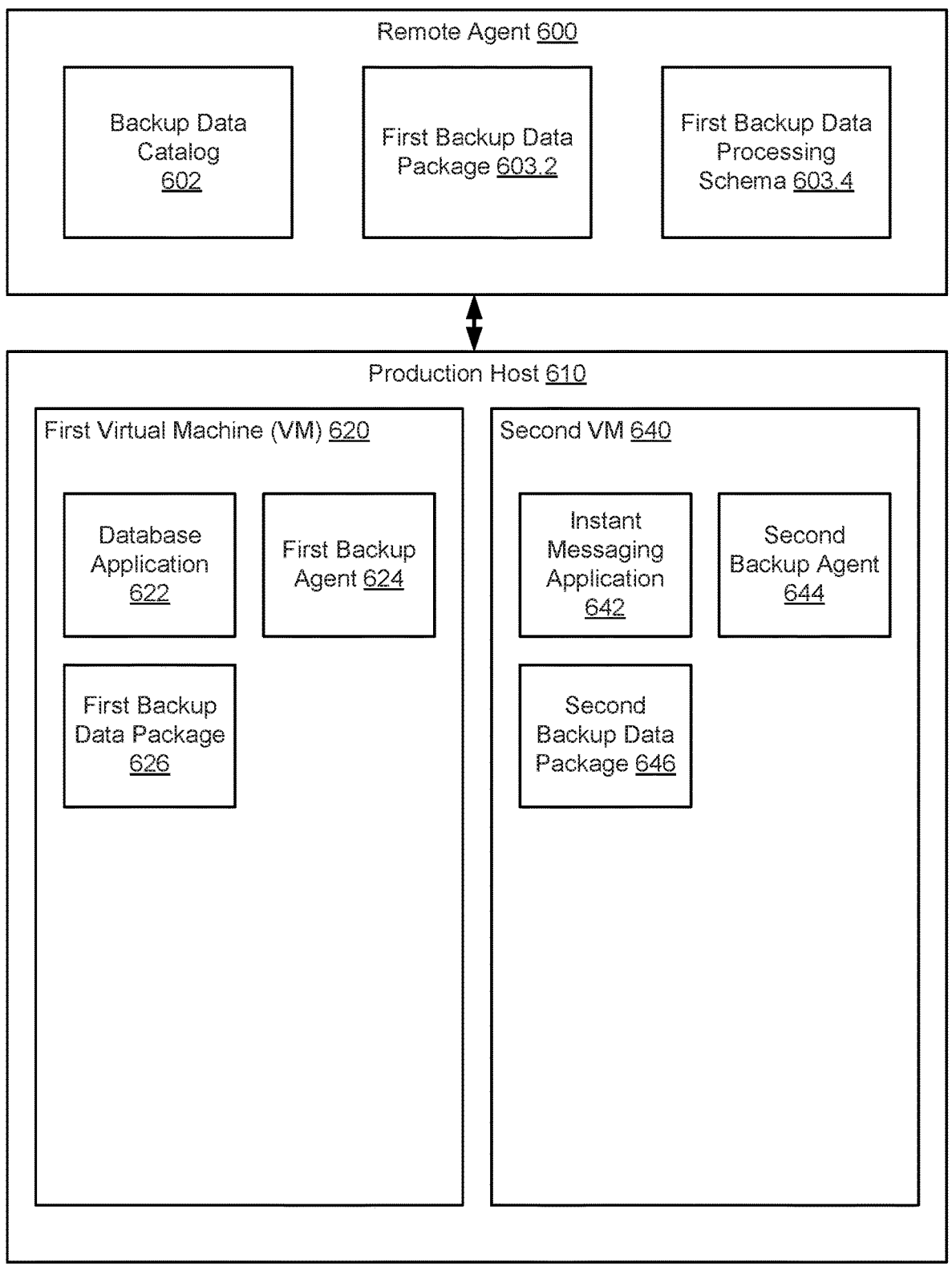
FIG. 6.4

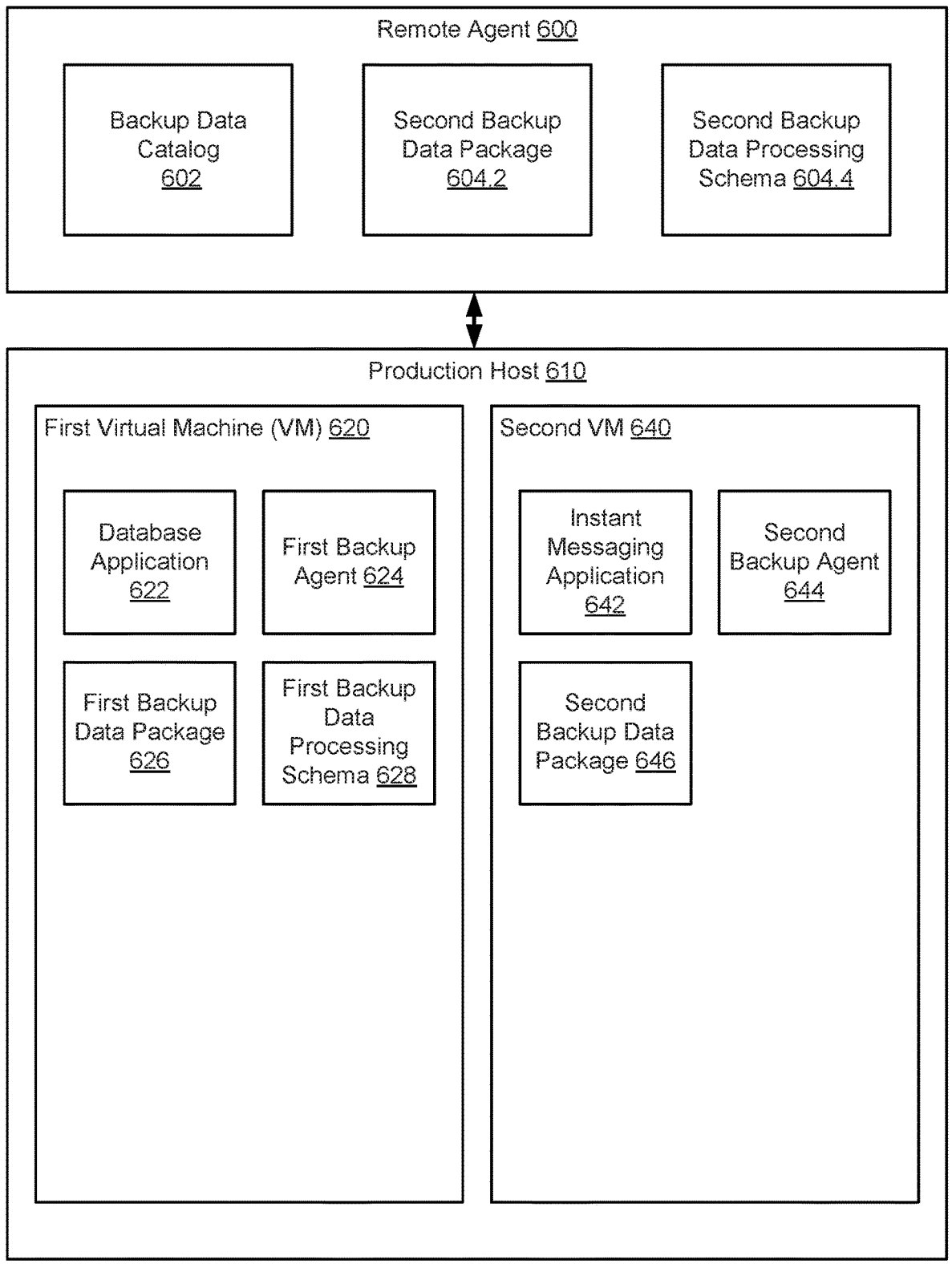
FIG. 6.5

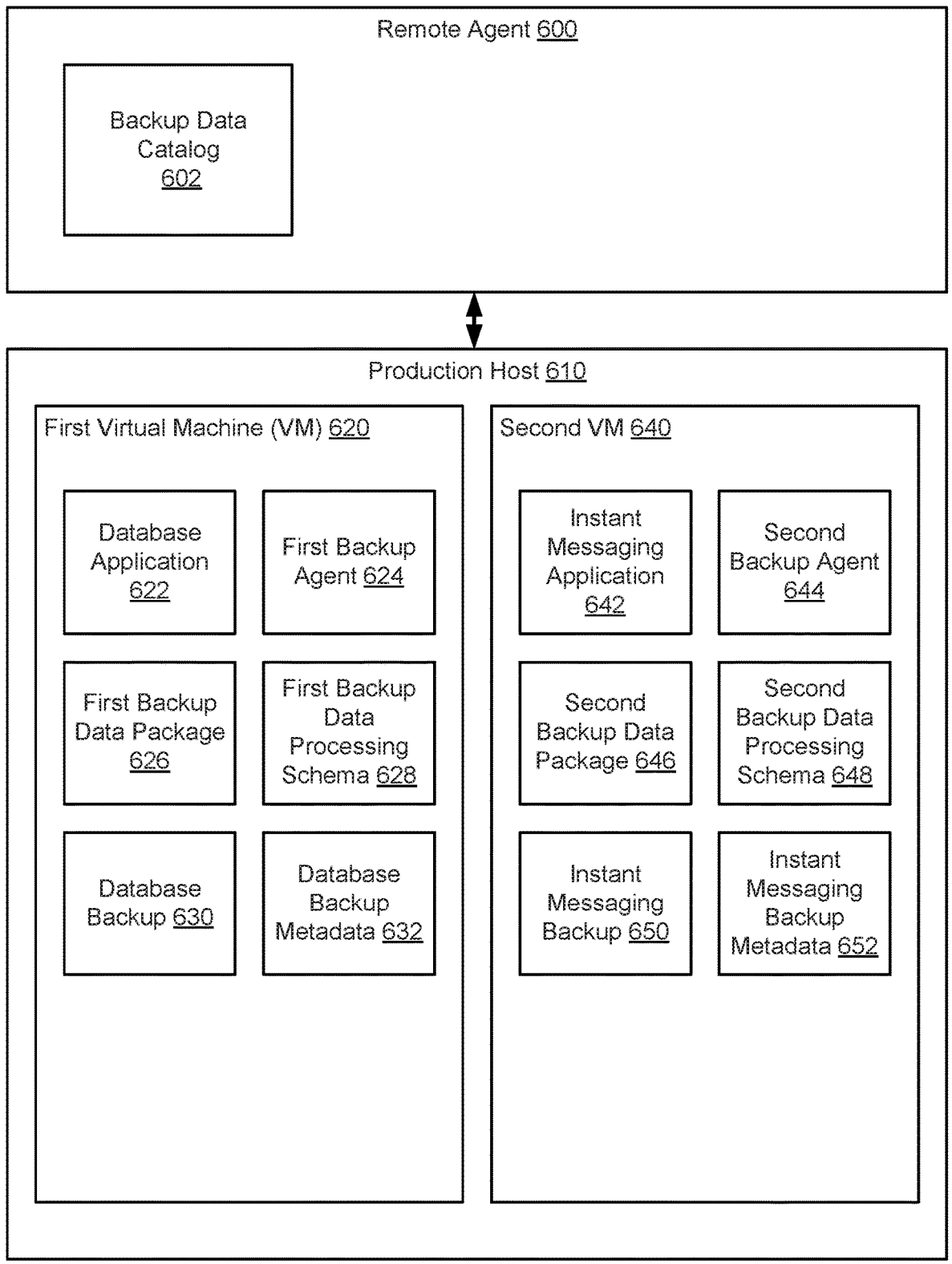
FIG. 6.6

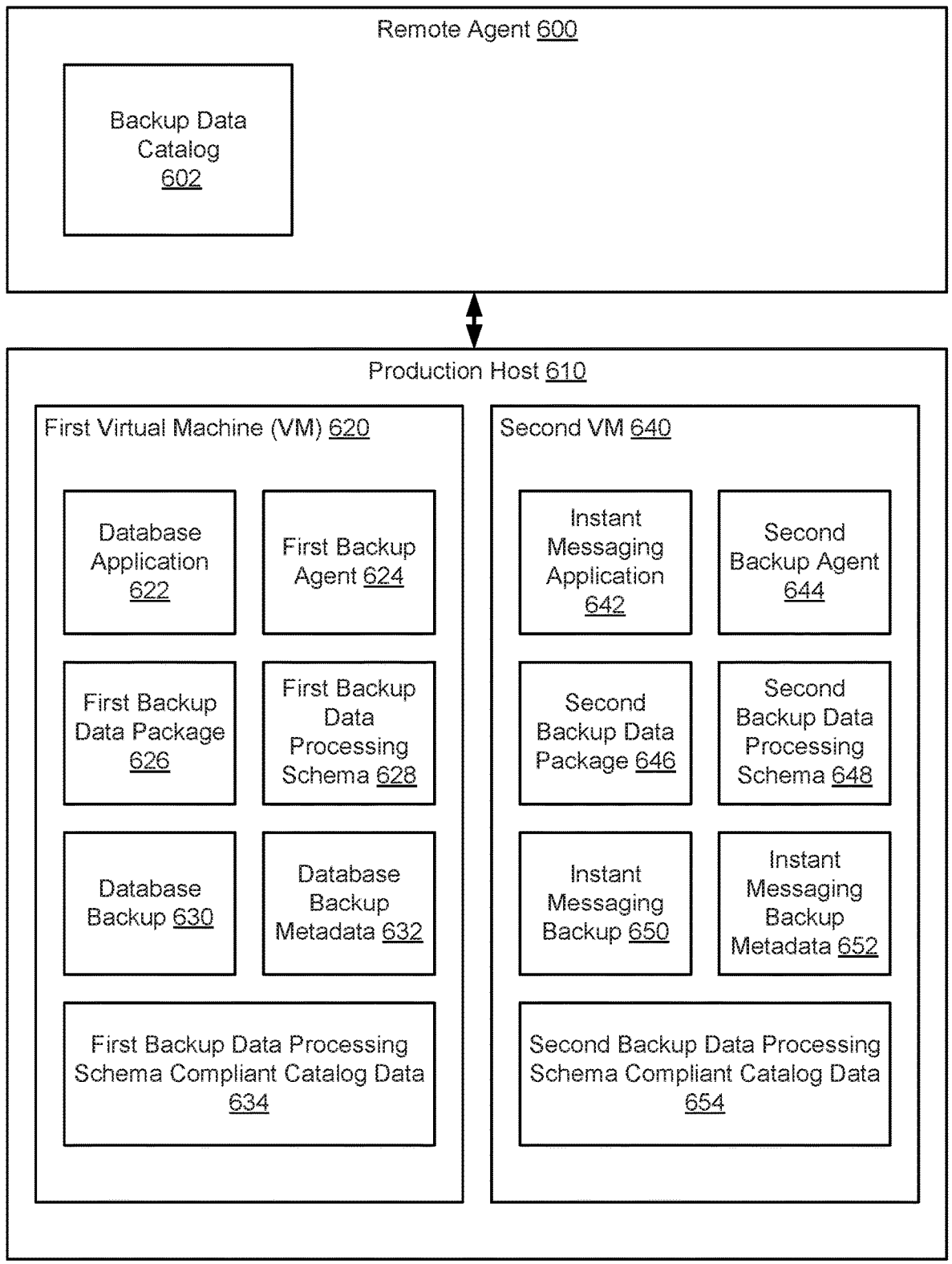
FIG. 6.7

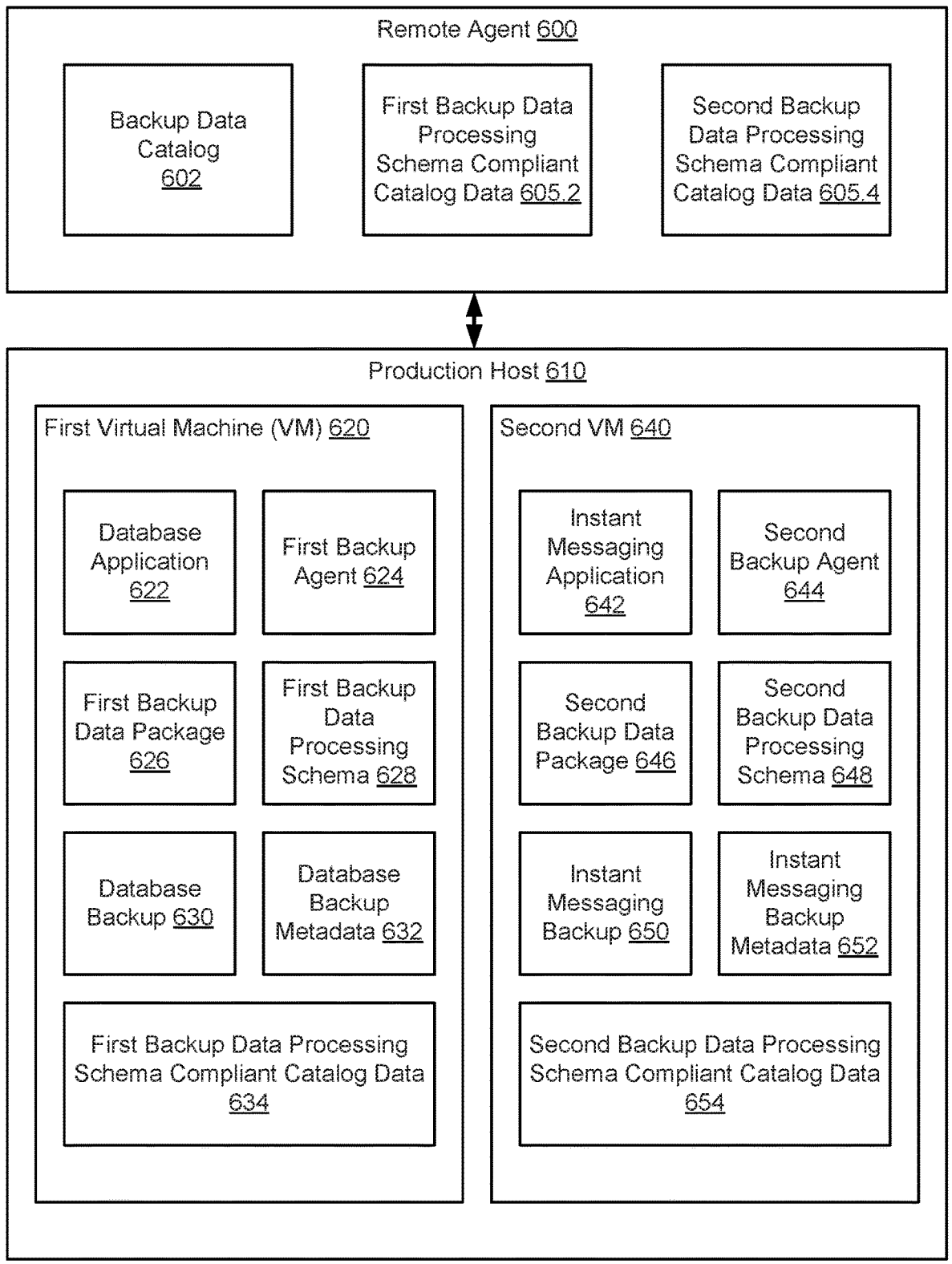
FIG. 6.8

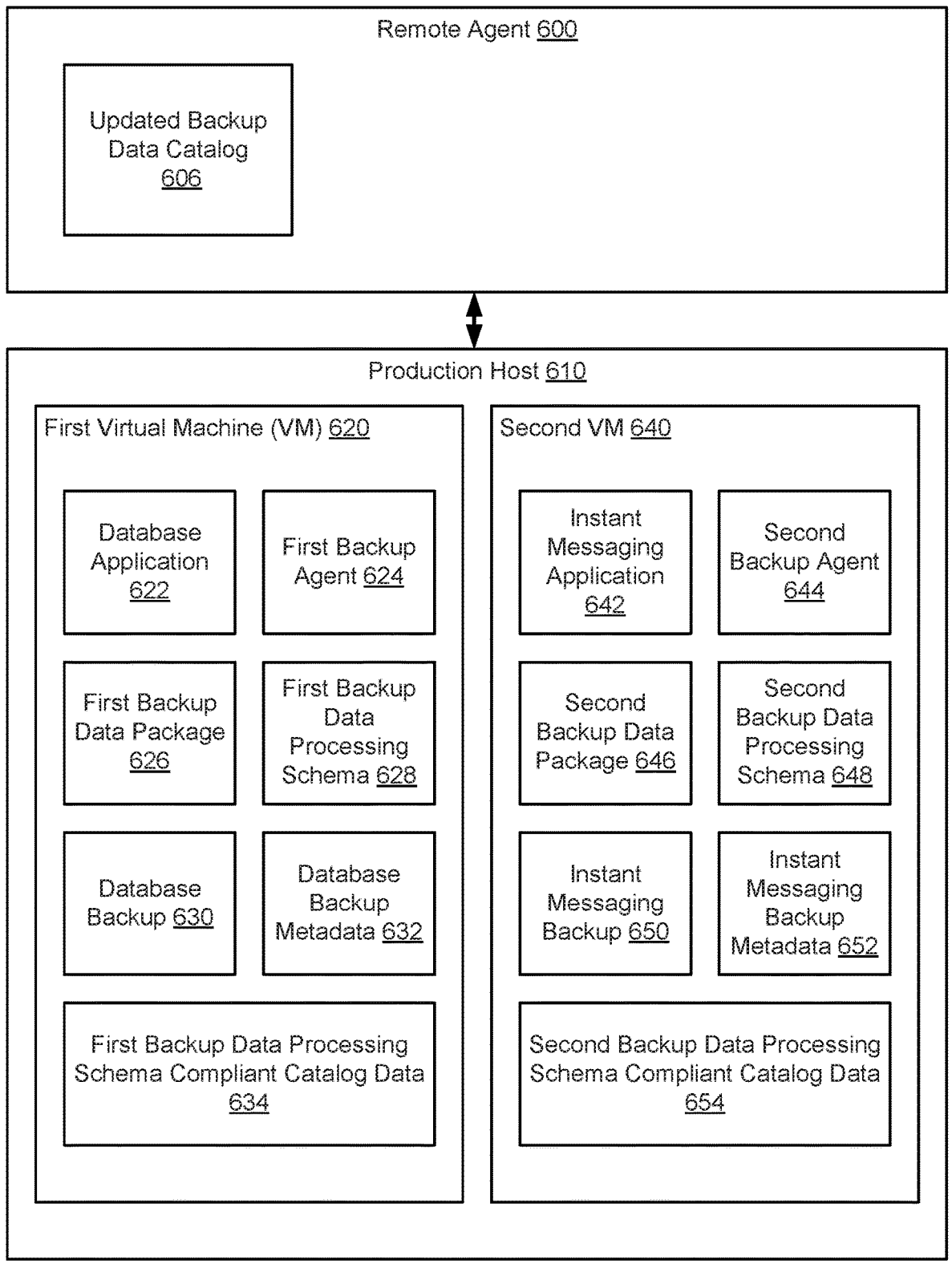
FIG. 6.9

US 10,776,041 B1

SYSTEM AND METHOD FOR SCALABLE BACKUP SEARCH

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost, it may be unrecoverable if no copies of the data were made and stored in locations other than the persistent storage. If copies of data are stored in other locations, the data may be separated from an application that utilizes the data. Due to the format of the data, it may be difficult to ascertain the contents of the data without utilizing the application that uses the data.

SUMMARY

In one aspect, a remote agent for providing data protection services to virtual machines in accordance with one or more embodiments of the invention includes persistent storage and a backup manager. The persistent storage is for storing a backup data catalog. The backup manager instantiates a backup agent in a new virtual machine of the virtual machines; obtains a backup data package associated with the new virtual machine using the backup agent, the backup data package specifies assets of the new virtual machine; generates a backup data processing schema for the new virtual machine based on the backup data package; initiates a backup generation for the new virtual machine to store a backup for the new virtual machine in backup storage; processes, using the backup agent, metadata associated with the backup using backup data processing schema to obtain backup data processing schema compliant catalog data; and provides search services for the backup using the backup data processing schema compliant catalog data and the backup data catalog.

In one aspect, a method for providing data protection services to virtual machines in accordance with one or more embodiments of the invention includes instantiating a backup agent in a new virtual machine of the virtual machines; obtaining a backup data package associated with the new virtual machine using the backup agent, the backup data package specifies assets of the new virtual machine; generating a backup data processing schema for the new virtual machine based on the backup data package; initiating a backup generation for the new virtual machine to store a backup for the new virtual machine in backup storage; processing, using the backup agent, metadata associated with the backup using backup data processing schema to obtain backup data processing schema compliant catalog data; and providing search services for the backup using the backup data processing schema compliant catalog data.

In one aspect, a non-transitory computer readable medium in accordance with one or more embodiments of the invention includes computer readable program code, which when executed by a computer processor enables the computer processor to perform a method for providing data protection services to virtual machines. The method includes instantiating a backup agent in a new virtual machine of the virtual machines; obtaining a backup data package associated with the new virtual machine using the backup agent, the backup data package specifies assets of the new virtual machine; generating a backup data processing schema for the new virtual machine based on the backup data package; initiating a backup generation for the new virtual machine to store a backup for the new virtual machine in backup storage; processing, using the backup agent, metadata associated with the backup using backup data processing schema to obtain backup data processing schema compliant catalog data; and providing search services for the backup using the backup data processing schema compliant catalog data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIGS. 6.1-6.9 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that distributes the computational load for processing backups, used for data protection services, across the distributed system. By doing so, it may be less likely that a single entity of the distributed system may form a bottleneck for the data protection services.

Additionally, embodiments of the invention may provide a method for processing backups and/or metadata regarding the backups in a standardized manner. To do so, a remote agent may identify assets hosted by each entity for which data protection services are to be provided. The remote agent may generate a customized method for processing the backups that will likely be generated for each entity. Standardizing the processing performed on the backups and/or metadata regarding the backups may enable distribution of the workload for performing the processing across any number of entities of the distributed system.

Figure 1:
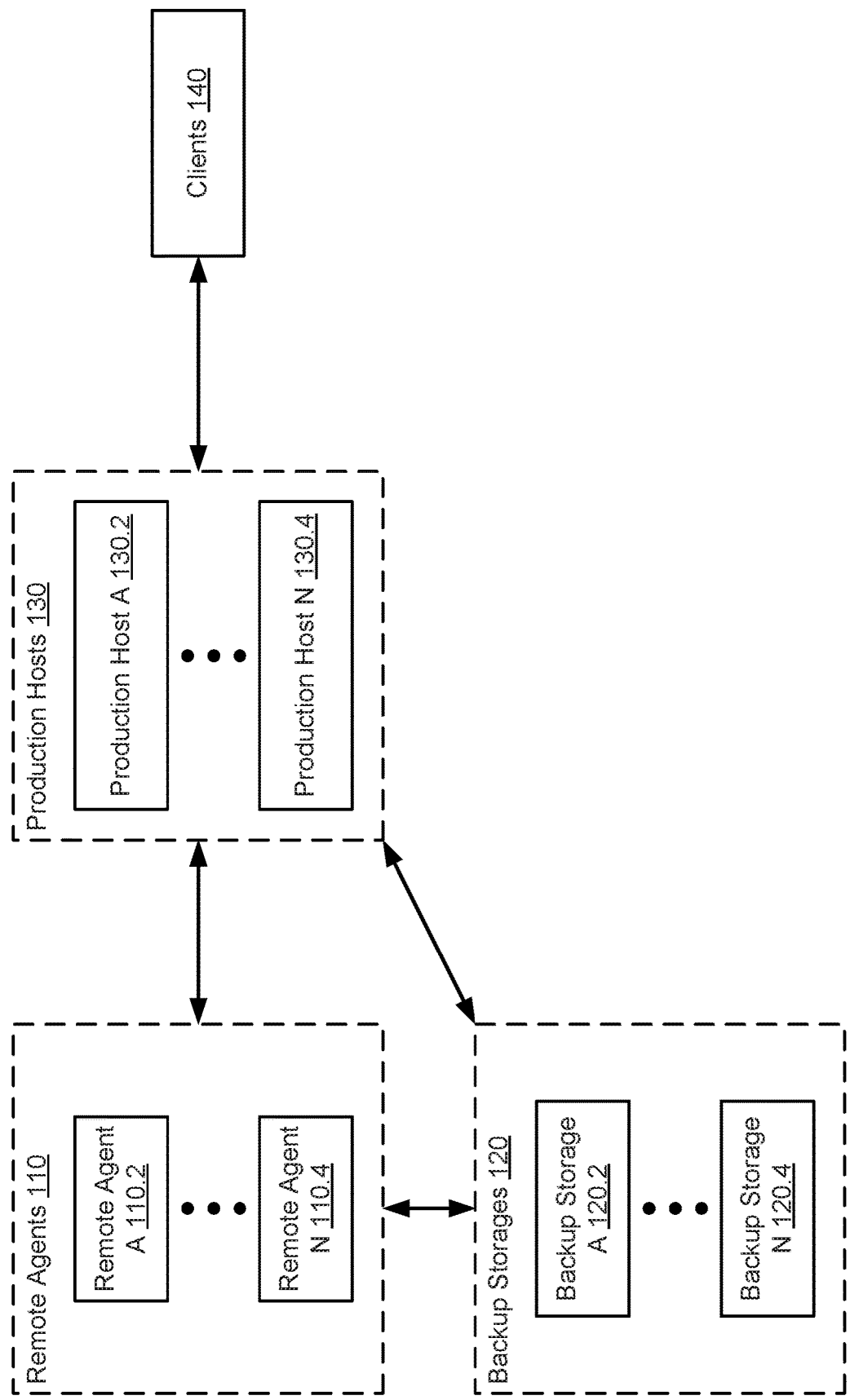
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include orchestrating generation of backups for the production hosts (130), orchestrating storage of the backups in backup storages (120), and searching the backups for desirable data using a backup data catalog maintained by the remote agents (110).

In one or more embodiments of the invention, the remote agents (110) are resource lite entities. That is, the remote agents (110) may be designed to minimize their computing resource consumption footprint. To provide their functionality while minimizing their computing resource footprint, the remote agents (110) may offload computationally expensive tasks associated with the data protection services to other entities of the system of FIG. 1. The remote agents (110) may orchestrate such offloading in a manner that ensures that data protection services are provided uniformly and consistently across the system of FIG. 1.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or a portion of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services (in accordance with data protection strategies orchestrated by the remote agents (110)) such as, for example, generating and storing backups in backup storages (120). By storing the backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system. For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 4-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored in the backup storages (120) includes backups of virtual machines hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state.

In one or more embodiments of the invention, the data stored in the backup storages (120) includes backups of applications hosted by the production hosts (130. For example, the production hosts (130) may host a virtual machine that hosts any number of applications. At a future point in time, it may become desirable to restore the state of the applications hosted by the virtual machine to a previous state. To do so, previously stored application level backups may be utilized to selectively restore states of the applications to prior states associated with the application level backups.

In one or more embodiments of the invention, the application level backups are generated using native functionality of the applications hosted by the production hosts (130). For example, the functionality of the applications may be invoked to cause the applications to generate a data structure that includes information that may be used to restore the state of the applications. However, the format and/or information included in such data structures may not be standardized. In other words, different applications may generate different types of data structures that include different types of information in different formats depending upon the application that generated the aforementioned data structure.

Further, when such backups are generated by the applications, metadata that describes the structure of the generated data structures may also be generated by the applications. Like the backups generated by the applications, the metadata generated by the applications may also have different structures and/or include different types of information depending upon the application that generated the metadata.

In one or more embodiments of the invention, the backup storages (120) store backups in a format that reduces the storage footprint size of the backups. For example, the backup storages (120) may remove all or a portion of the metadata associated with the backups. Thus, when the backups are stored in the backup storages (120), the backups may not be stored in a format that is natively searchable. Rather, to search the backups stored in the backup storages (120) directly, the backup data may need to be crawled and/or analyzed to identify different portions of the backups that may correspond to searched for information. Consequently, searching the backups stored in the backup storage (120) may be a very computationally expensive process.

While described above as storing backups of virtual machines (e.g., a virtual machine level backup) and/or applications (e.g., an application level backup), the backup storages (120) may store other types of data from the production hosts (130), or other entities, without departing from the invention. For example, the backup storages (120) may store archives or other data structures from the clients (140) and/or other entities.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the remote agents (110) described through this application and all, or a portion, of the methods illustrated in FIGS. 4-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) are distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110). The functionality of the remote agents (110) may be provided by other components of the system of FIG. 1 without departing from the invention.

In one or more embodiments of the invention, the remote agents (110) provide data protection services. Data protection services may include (i) orchestrating generation and storage of backups associated with the production hosts (130) in the backup storages and (ii) providing backup data search services. The system of FIG. 1 may include any number of remote agents (e.g., 110.2, 110.4).

To provide backup data search services, the remote agents (110) may maintain a backup data catalog that enables backups of the production hosts (130) to be searched without utilizing data stored in the backup storages (120). As discussed above with respect to the backup storages (120), the backups stored in the backup storage may be stored in a format that decreases the storage footprint of the backups at the cost of greatly increasing the computational cost for searching the backups using data stored in the backup storages (120). By maintaining a backup data catalog, the remote agents (110) may provide search services in a computationally efficient manner when compared to directly searching, e.g., indexing/walking, the backups stored in the backup storages (120).

To maintain the backup data catalog, the remote agents (110) may orchestrate obtaining of metadata associated with the backups in the backup storages (120) using computing resources of the production hosts (130). The metadata may include information that enables the backup data catalog maintained by the remote agents (110) to be updated as backups are stored in the backup storages (120). By doing so, the computational footprint of the remote agents (110) may be reduced by distributing the computational load for obtaining and/or processing metadata associated with the backups in the backup storages (120). For additional details regarding remote agents, refer to FIG. 3.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) backup services to the entities that provide the application services to the clients.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, file sharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, a backup storage, or another entity, that does not host the applications. In some cases, the application data may be spanned across multiple entities or multiple copies of the application data may be stored in multiple virtual machines to facilitate cooperative action by multiple instances of an application that are hosted by multiple virtual machines. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210). For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups and/or application level backups. A virtual machine level backup may be a backup that represents the state (or difference from one state to another state) of a virtual machine at a point in time. An application level backup may be a backup that represents the state (or difference from one state to another state) of a virtual machine at a point in time.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agents (230) may orchestrate data protection services including generation of backups and/or performance of restorations across the system.

In one or more embodiments of the invention, the production agent (230) includes functionality to report its activities to the remote agents. For example, the production agent (230) may monitor backups that are generated and send notifications of the generated backups to the remote agents. The notifications sent by the production agent (230) may include information regarding the type of backup generated, the storage location of the generated backup, and/or any other information regarding the generated and stored backups that may be relevant for data protection services provided by the remote agents. By doing so, remote agents may be notified of the backup generations for the entities hosted by the example production host (200).

The production agent (230) may also provide restoration services. Restoration services may enable entities that are now inaccessible due to, for example, failure of a host entity such as a production host to be instantiated in other locations and being in predetermined states. To provide restoration services, the production agent (230) may obtain any number of backups from backup storage and restore the entity using the backups. For example, a production agent (230) may obtain a virtual machine level backup and instantiate a copy of a virtual machine using the obtained backup. By doing so, a virtual machine may be restored in a state hosting an application in a predetermined state. Once in the predetermined state, the application may provide desired application services and/or enable access to application data of the application. Entities may be restored to different, desirable states using different combinations of previously generated backups and/or a portion of the backups.

Figure 4:
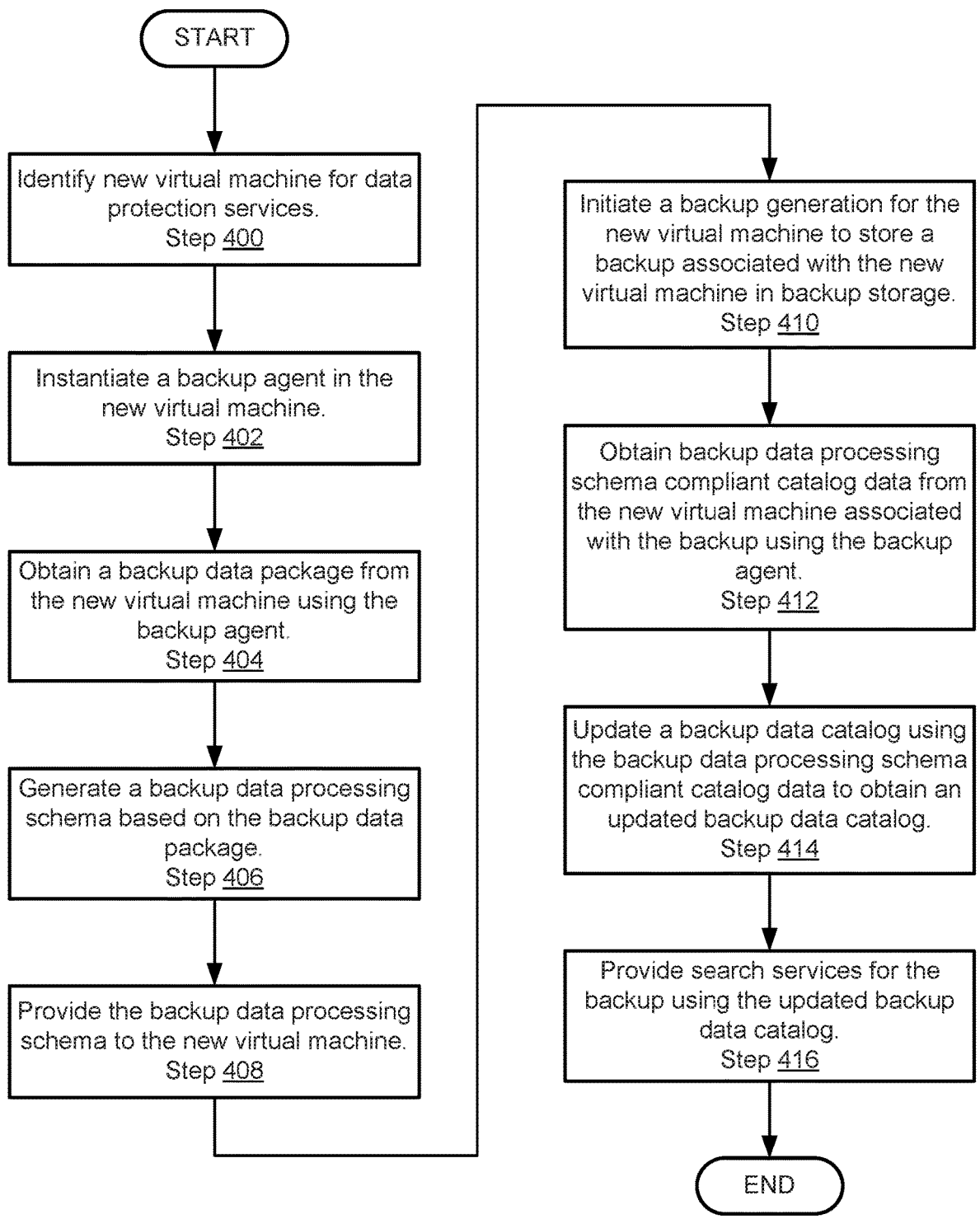
FIG. 4 shows a flowchart of a method of providing data protection services for a virtual machine in accordance with one or more embodiments of the invention.
Figure 5:
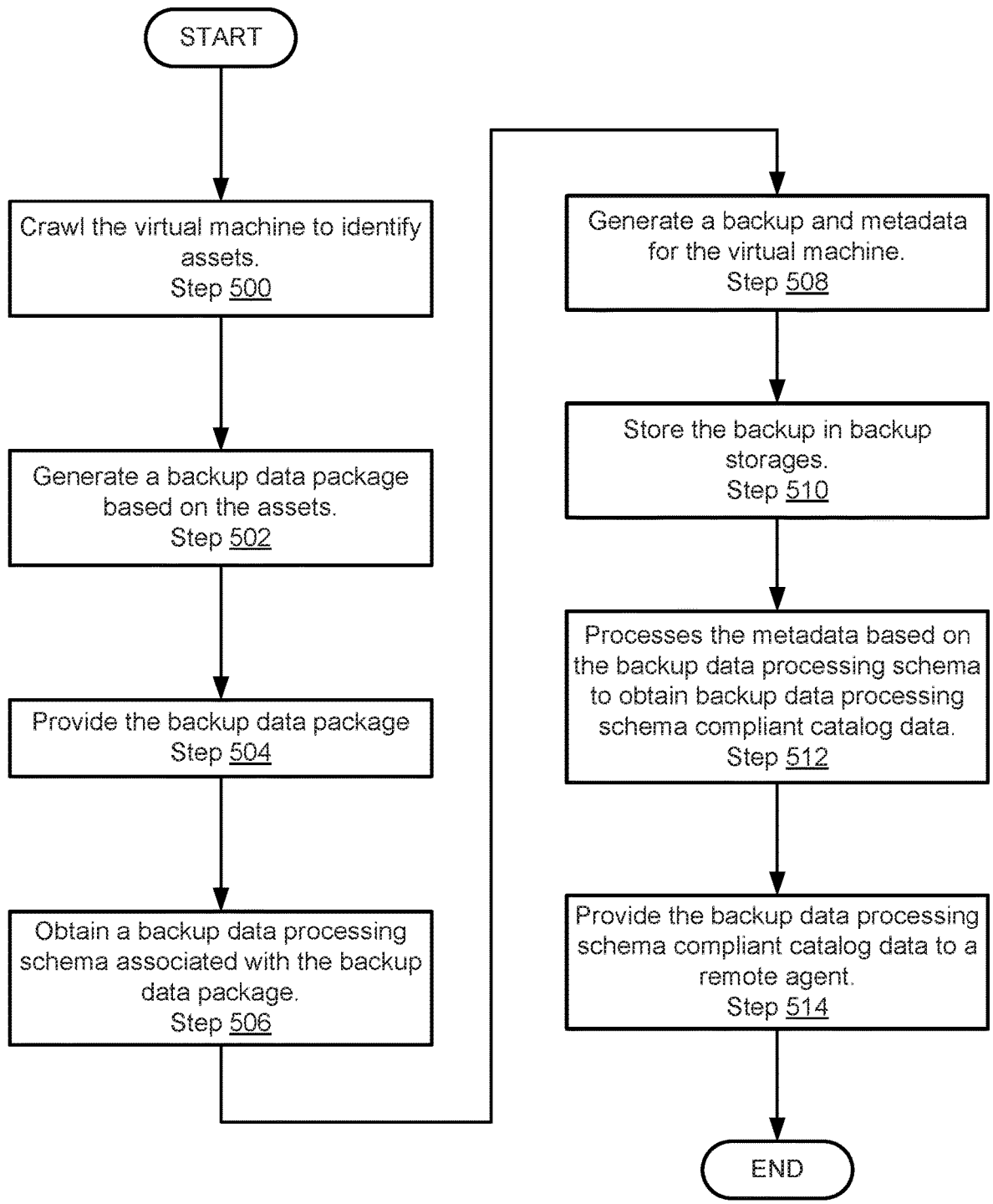
FIG. 5 shows a flowchart of a method of generating a backup in accordance with one or more embodiments of the invention.

To provide the above noted functionality of the production agent (230), the production agent (230) may perform all, or a portion, of the methods illustrated in FIGS. 4-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may include applications (252), a backup agent (254), and persistent storage (260). Each component of the example virtual machine (250) is discussed below.

As discussed above, the applications (252) may provide application services to clients and/or other entities. The applications (252) may be implemented as computer instructions, e.g., computer code, that when executed by a processor of the example virtual machine (250) gives rise to the functionality of the applications (252).

When providing application services to the clients and/or other entities, the applications (252) may generate application data (262) stored in the persistent storage (260). The application data (262) may be valuable to clients. When backups (266) for the virtual machine (250) are generated, the backups (266) may be based on portions of the application data (262). Consequently, the portions of the application data (262) may be restored to previous states using the backups (266).

The applications (252) may include functionality, that may be invoked by other entities, to generate application level backups. The application level backups may be a portion of the backups (266) that are used to restore the example virtual machine (250). When application level backups are generated, corresponding backup metadata (268) may be generated. The backup metadata (268) may be a description of the structure of the application level backups.

When the backups (266) are generated, a copy of the backups (266) may be stored in backup storages. Once stored, the local copy of the backups (266) may be discarded after a period of time. However, as noted above, the backups (266) may be stored free of the backup metadata (268) to reduce the storage footprint of the backups in backup storage.

The backup agent (254) may enable the remote agents to provide search services for the backups (266) stored in the backup storages. To enable the remote agents to provide search services, the backup agent (254) may identify the types of applications (252) hosted by the example virtual machine (250) and provide such information to the remote agents. The backup agent (254) may obtain a backup data processing schema (264) from the remote agents that has been customized based on the applications (252) hosted by the example virtual machine (250).

The backup data processing schema (264) may include information that enables the backup agent (254) to process the backup metadata (268) to generate a backup data package (270). As noted above, the backup metadata (268) may be generated by the applications (252). Consequently, different portions of the backup metadata (268) may be structured in different manners and/or include different types of information regarding the backups (266).

The backup data processing schema (264) may include actions for the different portions of the backup metadata (268) that enable the backup agent (254) to processing the different portions of the backup metadata (268). By doing so, information may be extracted from each of the portions of the backup metadata (268) that is relevant for providing backup data search services. The relevant information may be aggregated in the backup data package (270). Once the backup metadata is processed to obtain the backup data package (270), the backup agent (254) may provide the backup data package (270) to the remote agents. By doing so, information from each of the virtual machines may be obtained that enables all of the backups (e.g., 266) generated by the virtual machines and stored in the backup storages to be searched only using information hosted by the remote agents. Consequently, the remote agents may provide search services for the backups in backup storages without needing to access information included in the backup storages.

To provide the above noted functionality of the backup agent (254), the backup agent (254) may perform all, or a portion, of the method illustrated in FIG. 5.

In one or more embodiments of the invention, the backup agent (254) is implemented as computing code stored on a persistent storage (e.g., 260) that when executed by a processor performs the functionality of the backup agent (254). The processor may be a hardware processor including circuitry such as, for example, a central processing unit or a microcontroller. The processor may be other types of hardware devices for processing digital information without departing from the invention.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. Such storage resources of the persistent storage (260) may be used to host the application data (262), the backup data processing schema (264), the backups (266), the backup metadata (268), and/or the backup data package (270).

In one or more embodiments of the invention, the backup data processing schema (264) includes a list of actions to be performed when processing portions of the backup metadata (268) associated with each respective application of the applications (252). For example, the backup data processing schema (264) may include a first list of actions for processing a portion of the backup metadata (268) associated with the database application of the applications (252) and a second list of actions for processing a second portion of the backup metadata (268) associated with an email application of the applications (252). Each of the lists of the backup data processing schema (264) may include any number of actions of any type of action for processing the corresponding portions of the backup metadata (268).

A list of actions for processing a portion of the backup metadata (268) may include actions that cause the structural description of an application level backup of the backups (266) to be added to the backup data package (270). For example, the structural description may be a list of offsets to different portions of the backup metadata (268) that include the descriptors of the application level backup.

While the example virtual machine (250) of FIG. 2.2 has been described and illustrated as including a limited number of components for the sake of brevity, a virtual machine in accordance with embodiments of the invention may include additional, fewer, and/or different components than those illustrated in FIG. 2.2 without departing from the invention.

Figure 3:
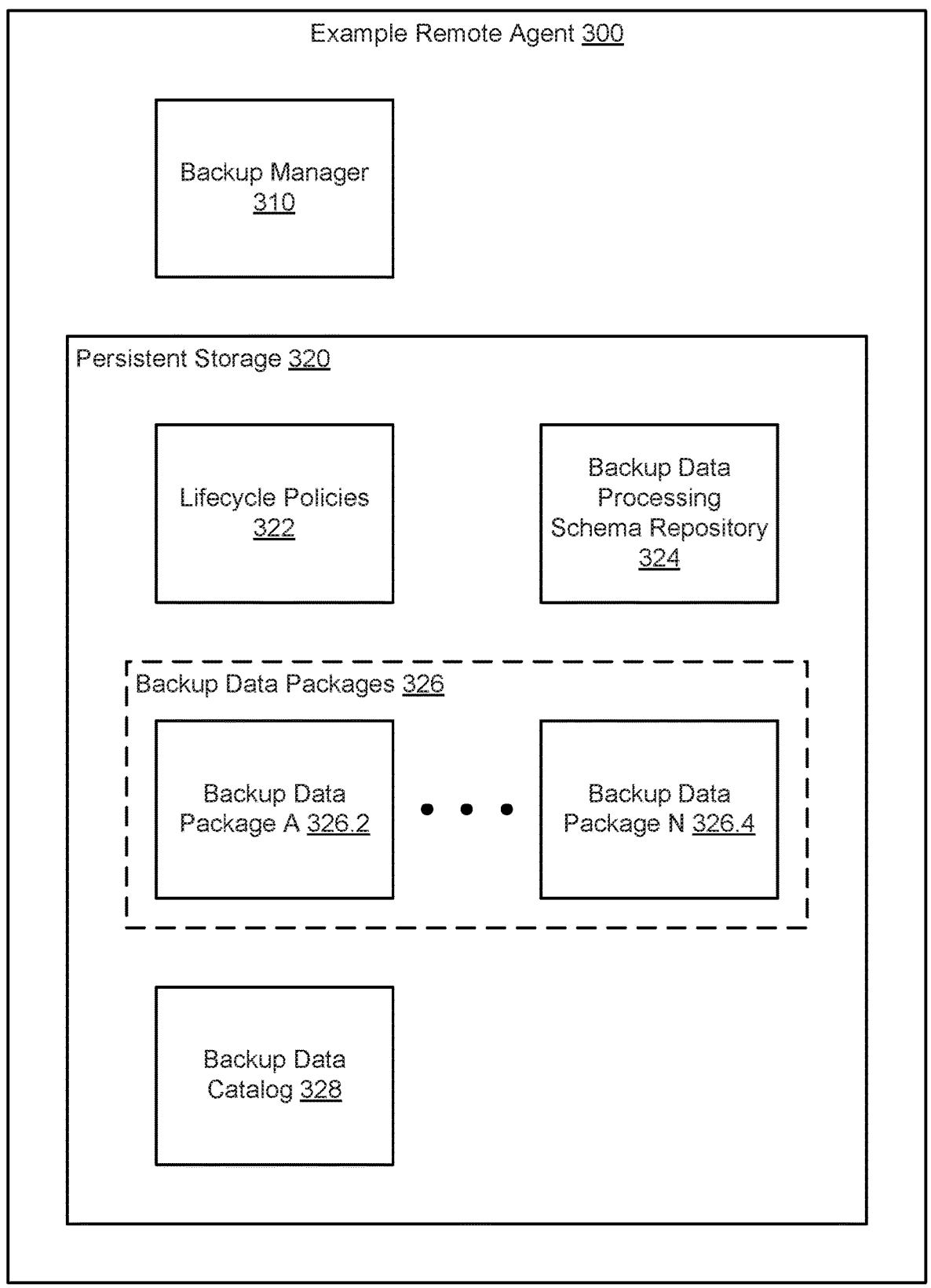
FIG. 3 shows a diagram of an example remote agent in accordance with one or more embodiments of the invention.

As discussed above, remote agents may provide data protection services. FIG. 3 shows a diagram of an example remote agent (300) in accordance with one or more embodiments of the invention. The example remote agent (300) may include a backup manager (310) and persistent storage (320). Each of these components of the example remote agent (300) is discussed below.

The backup manager (310) may (i) obtain information regarding applications hosted by virtual machines, (ii) generate and provide backup data processing schemas based on the information regarding the application hosted by each of the respective virtual machines to the respective virtual machines, (iii) obtain backup data packages from the virtual machines that include information regarding the structure of backups stored in the backup storages, (iv) maintain a backup data catalog (328) using the backup data packages, (v) orchestrate generation and storage of backups in backup storages, and (vi) provide search services for the backups stored in the backup storages using the backup data catalog. By doing so, the backup manager (310) may provide data search services while offloading the majority of the workload for maintaining the backup data catalog (328) to other entities, i.e., the production hosts. Consequently, the computational footprint of the backup manager (310) may be reduced when compared to a backup manager (310) that performs the majority of the workload for maintaining the backup data catalog (328).

To obtain information regarding the applications, the backup manager (310) may instantiate backup agents in the virtual machines. The backup manager (310) may obtain information regarding applications using the instantiated backup agents.

To generate and provide backup data processing schemas, the backup manager (310) may analyze the applications to identify corresponding actions stored in the backup data processing schema repository (324) that should be added to the backup data processing schema for a virtual machine. For example, the backup data processing schema repository (324) may include any number of sets of actions associated with any number of applications. The backup manager (310) may generate a backup data processing schema for a virtual machine by adding action sets corresponding to each of the applications hosted by the virtual machine to the backup data processing schema. The backup manager (310) may provide such backup data processing schemas to each of the virtual machines which data protection services will be provided by the example remote agent (300).

To obtain backup data packages from the virtual machines, the backup manager (310) may invoke the functionality of the instantiated backup agents. In response, the instantiated backup agents may process metadata associated with backups generated by the virtual machine hosting the respective instantiated backup agents to generate the backup data packages.

To maintain the backup data catalog (328) the backup manager (310) may update the backup data catalog (328) using backup data packages (326) obtained by the backup manager (310). The backup data catalog (328) may be updated using any number of backup data packages (e.g., 326.2, 326.4). By doing so, the backup data catalog (328) may enable the backups in the backup storages to be searched using the information included in the backup data catalog (328).

To orchestrate the generation and storage of backups for the production hosts, the backup manager (310) may implement data protection strategies specified by the lifecycle policies (322). To do so, the backup manager (310) may set appropriate instructions to the production hosts to cause production agents and/or backup agents to generate appropriate backups to satisfy requirements of the lifecycle policies (322).

Lifecycle policies (322) may specify when backups are to be generated, where the backups are to be stored, and/or other characteristics of the data protection strategies implemented by the example remote agent (300). The lifecycle policies (322) may specify data protection strategies for any number of production hosts and at any level of granularity without departing from the invention.

To provide search services for the backups in backup storages, the backup manager (310) may use information included in the backup data catalog (328) to respond to search requests. For example, the backup manager (310) may receive a request for a search of the backups in backup storage. In response to the request, the backup manager (310) may search the backup data catalog (328) using information included in the request as a key. If information that is relevant to the search is included in the backups stored in the backup storages, the backup data catalog (328) may include corresponding access information for the relevant information in the backup storages.

To provide the above noted functionality of the backup manager (310), the backup manager (310) may perform all, or a portion, of the method illustrated in FIG. 4.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a physical storage. The physical storage may include any combination of hard disk drives, solid state disk drives, tape drives, and/or any other physical storage mediums for the storage of data.

In one or more embodiments of the invention, the persistent storage (320) is a logical storage (e.g., virtualized storage) that utilizes any quantity of hardware storage resources of any number of computing devices for storing data. For example, the persistent storage (320) may utilize portions of any combination of hard disk drives, solid state disk drives, tape drives, and/or any other physical storage medium of any number of computing devices. The persistent storage (320) may store the lifecycle policies (322), the backup data processing schema repository (324), the backup data packages (326), and the backup data catalog (328).

While the example remote agent (300) of FIG. 3 has been described and illustrated as including a limited number of components for the sake of brevity, a remote agent in accordance with embodiments of the invention may include additional, fewer, and/or different components than those illustrated in FIG. 3 without departing from the invention.

Returning to FIG. 1, the remote agents (110) may provide data protection services to the production hosts (130) and/or other entities. FIG. 4 illustrates a method that may be performed by the remote agents of the system of FIG. 1 when providing data protection services.

FIG. 4 shows a flowchart of a method in accordance with one or more embodiments of the invention. The method depicted in FIG. 4 may be used to provide data protection services in accordance with one or more embodiments of the invention. The method shown in FIG. 4 may be performed by, for example, remote agents (e.g., 110, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a new virtual machine for data protection services is identified.

In one or more embodiments of the invention, the new virtual machine is identified when the virtual machine registers itself with a remote agent for data protection services. The new virtual machine may be identified via other methods without departing from the invention.

In step 402, a backup agent is instantiated in the new virtual machine.

In one or more embodiments of the invention, the backup agent is instantiated in the new virtual machine by sending instructions to instantiate the backup agent to a production host that hosts the new virtual machine. In response to receiving instructions, the production host may instantiate the backup agent in the new virtual machine.

In step 404, a backup data package is obtained from the new virtual machine using the backup agent.

In one or more embodiments of the invention, the backup data package is obtained by sending structures to the backup agent to generate the backup data package. In response to receiving instructions, the backup agent may generate the backup data package. The backup agent may generate the backup data package via the method illustrated in FIG. 5.

In step 406, a backup data processing schema is generated based on the backup data package.

In one or more embodiments of the invention, the backup data processing schema is generated by adding one or more actions to the backup data processing schema corresponding to applications specified in the backup data package. For example, the backup data package may specify each of the applications hosted by the new virtual machine. For each of the specified applications, corresponding actions stored in a backup data processing schema may be obtained. The backup data processing schema may be populated using the obtained actions by adding the actions to the backup data processing schema.

In step 408, the backup data processing schema is provided to the new virtual machine.

In one or more embodiments of the invention, the backup data processing schema is provided to the new virtual machine by sending a copy of the backup data processing schema to the virtual machine. The backup data processing schema may be provided to the new virtual machine via other methods without departing from the invention.

In step 410, a backup generation for the new virtual machine is initiated to store backups associated with the new virtual machine in backup storages.

In one or more embodiments of the invention, the backup generation for the new virtual machine is initiated by sending instructions to a backup agent hosted by the new virtual machine to generate the backup. The backup generation may be for generating a backup of one or more applications hosted by the new virtual machine. In other words, performing the backup generation may result in the generation of one or more application level backups. Additionally, when the one or more application level backups are generated corresponding metadata for each of the one or more application level backups may be generated. The metadata may specify a structure of the backups and/or otherwise enable the contents of the generated application level backups to be indexed.

In one or more embodiments of the invention, backups generated during the backup generation are stored in backup storages. The backups may be stored in a format that is not natively searchable. For example, the backups may be stored without corresponding metadata that describes the structure of the backups.

In step 412, a backup data processing schema compliant catalog data is obtained from the new virtual machine associated with the backup using the backup agent.

In one or more embodiments of the invention, the backup data processing schema compliant catalog data is generated by the backup agent. The backup agent may do so by performing one or more actions specified by the backup data processing schema on metadata associated with backups generated by the backup generation of step 410.

In one or more embodiments of the invention, the backup data processing schema compliant catalog data includes an index of the portions of the backups generated by the backup generation of step 410. For example, the backup data processing schema compliant catalog data may include identifiers of portions of the backups and access information for each of the portions of the backups. The access information may be, for example, offsets for each of the portions of the backups identified by the identifiers of the portions of the backups.

In step 414, a backup data catalog is updated using the backup data processing schema compliant catalog data to obtain an updated backup data catalog.

In one or more embodiments of the invention, the backup data catalog is updated by adding an index included in the backup data processing schema compliant catalog data to the backup data catalog.

In one or more embodiments of the invention, the backup data catalog is updated by modifying the backup data catalog to reflect an index included in the backup data processing schema compliant catalog data to the backup data catalog. For example, portions of the backup data catalog may be modified based on the contents of the index included in the backup data processing schema compliant catalog data. The backup data catalog may be updated to reflect the backup data processing schema compliant catalog data via other methods without departing from the invention.

In one or more embodiments of the invention, updating the backup data catalog using the backup data processing schema compliant catalog data causes the updated backup data catalog to reflect contents of the backups in backup storages.

In step 416, search results services for the backup are provided using the updated backup data catalog.

In one or more embodiments of the invention, search results services are provided by obtaining search requests from entities regarding data included in the backups stored in the backup storages, searching the backup data catalog based on the search requests, and providing search results based on the searching of the backup data catalog. The search results may include an indication of whether information searched for is included in the backups in the backup storages. The search results may include access information that enables portions of the backups in backup storages to be obtained.

The method may end following step 416.

Thus, via the method illustrated in FIG. 4 one or more embodiments of the invention may facilitate the generation and storage of backups and backup storages while enabling the backups to be searched without using information stored in the backup storages.

As discussed with respect to FIG. 4, backup agents may provide backup data processing schema compliant catalog data to enable remote agents to provide backup search services. FIG. 5 shows a flowchart of a method in accordance with one or more embodiments of the invention. The method depicted in FIG. 5 may be used to provide backup data processing schema compliant catalog data in accordance with one or more embodiments of the invention. The method shown in FIG. 5 may be performed by, for example, production hosts (e.g., 130, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a virtual machine is crawled to identify assets.

In one or more embodiments of the invention, the assets are applications that store application data in the virtual machine. The virtual machine may be crawled to identify the assets by querying an operating system of the virtual machine to determine whether the virtual machine is hosting any applications. If the virtual machine is hosting any applications, the applications may be identified as the assets.

In step 502, a backup data package is generated based on the assets.

In one or more embodiments of the invention, the backup data package is a data structure that includes identifiers of each of the applications hosted by the virtual machine. For example, the backup data package may include an identifier of the database application hosted by the virtual machine.

In step 504, the backup data package is provided to a remote agent.

In one or more embodiments of the invention, the backup data package is provided to a remote agent that instantiated a backup agent performing the method of FIG. 5.

In one or more embodiments of the invention, the backup data package is provided by sending a copy of the backup data package to the remote agent. The backup data package may be provided to the remote agent via other methods without departing from the invention.

In step 506, a backup data processing schema associated with the backup data package is obtained.

In one or more embodiments of the invention, the backup data processing schema includes groups of actions associated with each of the applications hosted by the virtual machine. The actions associated with each of the applications may specify how to process metadata generated by each of the corresponding applications.

In step 508, a backup and metadata are generated for the virtual machine.

In one or more embodiments of the invention, the backup and metadata are generated by invoking functionality of the applications hosted by the virtual machine. The functionality may be the ability of the applications to generate a backup for the applications. The functionality may also include generating metadata for the backup.

In one or more embodiments of the invention, the backup and metadata for the virtual machine are generated in response to a backup generation request from a remote agent that is providing data protection services for the virtual machine and/or a production host that hosts the virtual machine.

In step 510, the backup is stored in backup storages.

In one or more embodiments of the invention, the backup is stored by sending a copy of the backup to backup storages. A local copy of the backup hosted by the virtual machine may be deleted after the backup is stored in the backup storages.

In step 512, the metadata is processed based on the backup data processing schema to obtain backup data processing schema compliant catalog data.

In one or more embodiments of the invention, the metadata is processed by performing one or more actions specified by the backup data processing schema. The one or more actions may be associated with an application that generated the metadata. Performing the actions may generate data that enables the backup to be searched. For example, the data may be an index of the backup. The index may specify the various portions of the backup and access information for the portions of the backup.

In step 514, the backup data processing schema compliant catalog data is provided to the remote agent.

In one or more embodiments of the invention, the remote agent uses the backup data processing schema compliant catalog data to update a backup data catalog. The updated backup data catalog may be used to search the backups of the backup storages without using information stored in the backup storages.

The method may end following step 514.

Thus, via the method illustrated in FIG. 5, a remote agent may process metadata for backups using computing resources of production hosts. Consequently, the computing resource footprint of the remote agent may be reduced when compared to remote agents that process metadata for backups. Further, by providing a backup data processing schema to the backup agent, metadata from any number of virtual machines may be processed any uniform manner. By doing so, the workload for updating a backup data catalog may be distributed across any number of devices.

To further clarify embodiments of the invention, a non-limiting example is provided in FIGS. 6.1-6.9. Each of these figures may illustrate a system similar to that illustrated in FIG. 1 at different points in times. For the sake of brevity, only a limited number of components of the system of FIG. 1 are illustrated in each of FIGS. 6.1-6.9.

Example

Consider a scenario as illustrated in FIG. 6.1 in which a remote agent (600) is providing data protection services to a production host (610). As part of the data protection services, the remote agent (600) maintains a backup data catalog (602) that reflects backups stored in backup storage associated with entities for which the remote agent (600) provides the data protection services.

The production host (610) hosts a first virtual machine (620) and a second virtual machine (640). The first virtual machine (620) hosts a database application (622). The second virtual machine hosts an instant messaging application (642). Both of these applications provide application services to clients (not shown). By providing these application services to the clients, information that is relevant to the clients may be stored in the application data (not shown) associated with the applications.

To provide data protection services to the production host (610), the remote agent (600) instantiates a first backup agent (624) in the first virtual machine (620) and a second backup agent (644) in the second virtual machine (640) as illustrated in FIG. 6.2. After instantiating the backup agents, the remote agent (600) instructs all of the backup agents to provide information regarding the assets hosted by the virtual machines.

In response to the instructions from the remote agent (600), the first backup agent (624) queries an operating system of the first virtual machine (620) to identify any applications hosted by the first virtual machine (620). In response, the operating system of the first virtual machine (620) notifies the first backup agent (624) of the database application (622). Like the first backup agent (624), the second backup agent (644) queries the operating system of the second virtual machine (640) to identify that the second virtual machine (640) hosts the instant messaging application (642).

Using the obtained information regarding the database application (622), the first backup agent (624) generates a first backup data package (626) including an identifier of the database application (622) as illustrated in FIG. 6.3. Similarly, the second backup agent (644) generates a second backup data package (646) that includes an identifier of the instant messaging application (642).

After generating the aforementioned backup data packages, the first backup agent (624) provides a copy of the first backup data package (603.2) to the remote agent (600) as illustrated in FIG. 6.4. Using the first backup data package (603.2), the remote agent (600) generates a first backup data processing schema (603.4) based on the identifier of the database application (622) included in the first backup data package (603.2). The first backup data processing schema (603.4) includes a first set of actions that enables the first virtual machine (620) to process metadata generated by the database application (622).

After generating the first backup data processing schema (603.4), the remote agent (600) provides a copy of the first backup data processing schema (628) to the first virtual machine (620) as illustrated in FIG. 6.5. Like the first backup agent (624) the second backup agent (644) provides a copy of the second backup data package (604.2) to the remote agent (600). The remote agent (600) generates a second backup data processing schema (604.4) based on the identifier of the instant messaging application (642) included in the second backup data package (604.2).

Like the first backup data processing schema (628), the second backup data processing schema (604.4) includes a second set of actions that enables the second virtual machine (640) to process metadata generated by the instant messaging application (642). However, the second backup data processing schema (604.4) includes different actions from those included in the first backup data processing schema (628).

After generation, the remote agent (600) provides a copy of the second backup data processing schema (648) to the second virtual machine (640) as illustrated in FIG. 6.6. In the state illustrated in FIG. 6.6, both the first backup agent (624) and the second backup agent (644) are able to process metadata associated with backups generated by the applications hosted by each of the respective virtual machines.

After the first virtual machine (620) and the second virtual machine (640) obtain respective backup data processing schemas, the remote agent (600) instructs each of the virtual machines to generate backups of the applications hosted by the respective virtual machines.

In response to receiving the instructions, the first backup agent (624) instructs the database application (622) to generate a database backup (630) and database backup metadata (632). Similarly, the second backup agent (644) instructs the instant messaging application (642) to generate an instant messaging backup (650) and instant messaging backup metadata (652).

After the database backup metadata (632) is generated, the first backup agent (624) processes the database backup metadata (632) using the first backup data processing schema (628) to obtain first backup data processing schema compliant backup catalog data (634) as illustrated in FIG. 6.7. The first backup data processing schema compliant catalog data (634) includes a listing of the portions of the database backup (630) and access information for the portions of the database backup (630).

Similarly, the second backup agent (644) processes the instant messaging backup metadata (652) using the second backup data processing schema (648) to obtain second backup data processing schema compliant catalog data (654). The second backup data processing schema compliant catalog data (654) includes a listing of the portions of the instant messaging backup (650) and access information for the portions of the instant messaging backup (650).

After generation of the catalog data (e.g., 634, 654), the backup agents (624, 644) send copies of the catalog data (605.2, 605.4) to the remote agent (600) as illustrated in FIG. 6.8. In response to receiving the catalog data (605.2, 605.4), the remote agent (600) updates the backup data catalog (602) using the catalog data (605.2, 605.4) to obtain an updated backup data catalog (606) as illustrated in FIG. 6.9. The updated backup data catalog (606) reflects the information included in the database backup (630) and the instant messaging backup (650) for search purposes.

After obtaining the updated backup data catalog (606), copies of the database backup (630) and the instant messaging backup (650) are sent to backup storages for storages. However, copies of the corresponding metadata (632, 652) for the backups (630, 650) are not stored in the backup storages rendering the backups stored in the backup storages to not be natively searchable. Thus, in the state illustrated in FIG. 6.9, the remote agent (600) is able to provide search functionality for the backups stored in the backup storages without utilizing data included in the backup storages. Rather, the remote agent (600) provides such search functionality using the updated backup data catalog (606).

End of Example

Figure 7:
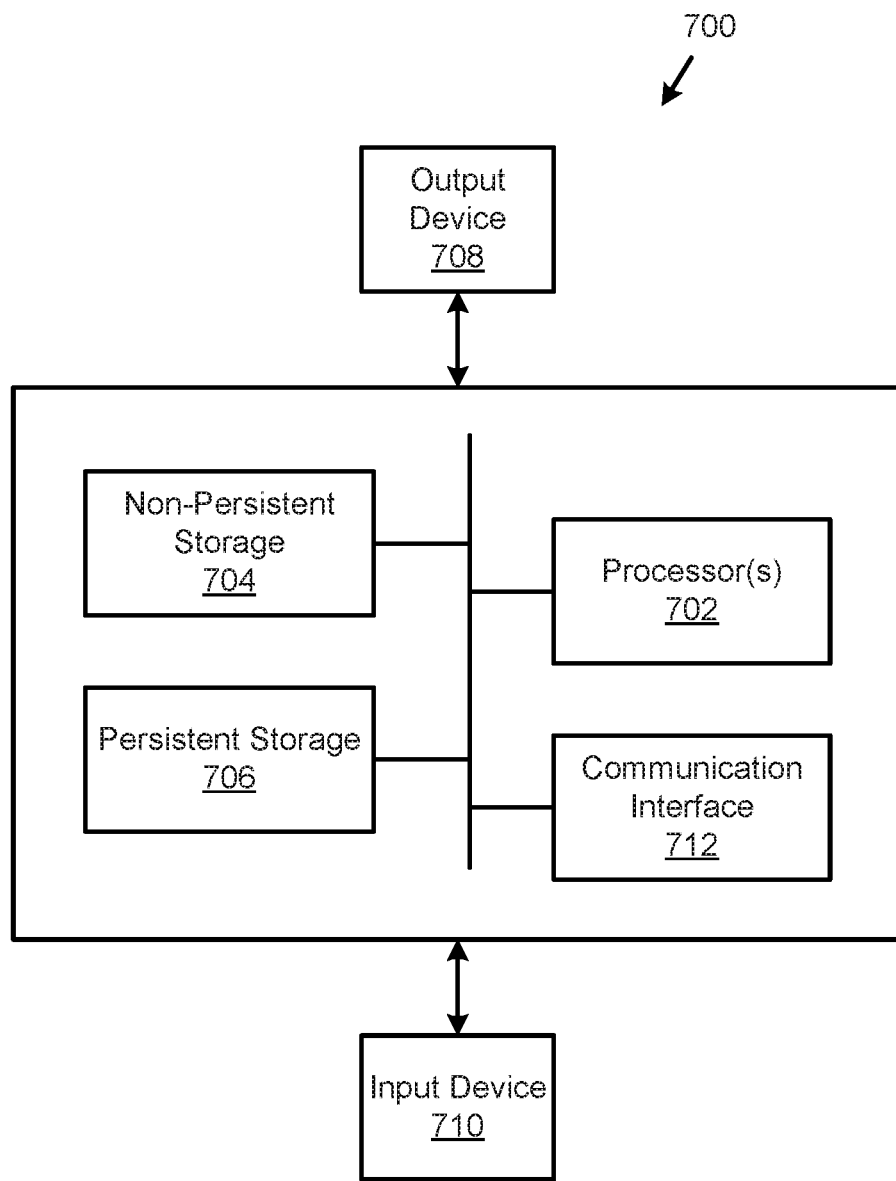
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a method for distributing backup data and/or backup metadata processing across a distributed system. By doing so, the computational footprint of the management entity, e.g., a remote agent, may be reduced when compared to backup systems that may centralize processing of backups and/or metadata in management entities.

Thus, embodiments of the invention may address the problem of the limited availability of computational resources in a distributed system that relies on data redundancy for data protection purposes. Specifically, embodiments of the invention may provide a method of distributing the computational load for processing backups and/or backup metadata for search functionality purposes.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for providing data protection services to virtual machines, comprising:
persistent storage for storing a backup data catalog; and
a backup manager programmed to:
instantiate a backup agent in a new virtual machine of the virtual machines;
obtain a backup data package associated with the new virtual machine using the backup agent, wherein the backup data package specifies assets of the new virtual machine;
generate a backup data processing schema for the new virtual machine based on the backup data package;
initiate a backup generation for the new virtual machine to store a backup for the new virtual machine in backup storage;
process, using the backup agent, metadata associated with the backup using backup data processing schema to obtain backup data processing schema compliant catalog data; and
provide search services for the backup using the backup data processing schema compliant catalog data and the backup data catalog.

2. The remote agent of claim 1, wherein the metadata comprises:
first metadata generated by a first application hosted by the new virtual machine; and
second metadata generated by a second application hosted by the new virtual machine.

3. The remote agent of claim 2, wherein the backup data processing schema specifies at least:
first actions for processing the first metadata; and
second actions for processing the second metadata,
wherein the first actions are different from the second actions.

4. The remote agent of claim 2, wherein the backup comprises:
first backup data generated by the first application hosted by the new virtual machine; and
second backup data generated by a second application hosted by the new virtual machine.

5. The remote agent of claim 1, wherein providing the search services for the backup using the backup data processing schema compliant catalog data and the backup data catalog comprises:
updating the backup data catalog using the backup data processing schema compliant catalog data to obtain an updated backup data catalog, wherein the backup data catalog is associated with a plurality of backups that comprises the backup, and wherein the plurality of backups is stored in backup storage;
obtaining a request for a portion of the backup;
searching the plurality of backups using the updated backup data catalog for the portion of the backup to obtain a search result; and
providing the search result in response to the request for the portion of the backup.

6. The remote agent of claim 5, wherein the plurality of backups is stored in a format that is not natively searchable.

7. The remote agent of claim 1, wherein the backup data processing schema compliant catalog data comprises indexing information for the backup.

8. A method for providing data protection services to virtual machines, comprising:

instantiating a backup agent in a new virtual machine of the virtual machines;

obtaining a backup data package associated with the new virtual machine using the backup agent, wherein the backup data package specifies assets of the new virtual machine;

generating a backup data processing schema for the new virtual machine based on the backup data package;

initiating a backup generation for the new virtual machine to store a backup for the new virtual machine in backup storage;

processing, using the backup agent, metadata associated with the backup using backup data processing schema to obtain backup data processing schema compliant catalog data; and providing search services for the backup using the backup data processing schema compliant catalog data.

9. The method of claim 8, wherein the metadata comprises:

first metadata generated by a first application hosted by the new virtual machine; and second metadata generated by a second application hosted by the new virtual machine.

10. The method of claim 9, wherein the backup data processing schema specifies at least:

first actions for processing the first metadata; and second actions for processing the second metadata, wherein the first actions are different from the second actions.

11. The method of claim 9, wherein the backup comprises:

first backup data generated by the first application hosted by the new virtual machine; and second backup data generated by a second application hosted by the new virtual machine.

12. The method of claim 8, wherein providing the search services for the backup using the backup data processing schema compliant catalog data comprises:

updating a backup data catalog using the backup data processing schema compliant catalog data to obtain an updated backup data catalog, wherein the backup data catalog is associated with a plurality of backups that comprises the backup, and wherein the plurality of backups is stored in backup storage;

obtaining a request for a portion of the backup;

searching the plurality of backups using the updated backup data catalog for the portion of the backup to obtain a search result; and providing the search result in response to the request for the portion of the backup.

13. The method of claim 12, wherein the plurality of backups is stored in a format that is not natively searchable.

14. The method of claim 8, wherein the backup data processing schema compliant catalog data comprises indexing information for the backup.

15. A non-transitory computer readable medium comprising computer readable program code, which when executed by a computer processor enables the computer processor to perform a method for providing data protection services to virtual machines, the method comprising:

instantiating a backup agent in a new virtual machine of the virtual machines;

obtaining a backup data package associated with the new virtual machine using the backup agent, wherein the backup data package specifies assets of the new virtual machine;

generating a backup data processing schema for the new virtual machine based on the backup data package;

initiating a backup generation for the new virtual machine to store a backup for the new virtual machine in backup storage;

processing, using the backup agent, metadata associated with the backup using backup data processing schema to obtain backup data processing schema compliant catalog data; and providing search services for the backup using the backup data processing schema compliant catalog data.

16. The non-transitory computer readable medium of claim 15, wherein the metadata comprises:

first metadata generated by a first application hosted by the new virtual machine; and second metadata generated by a second application hosted by the new virtual machine.

17. The non-transitory computer readable medium of claim 16, wherein the backup data processing schema specifies at least:

first actions for processing the first metadata; and second actions for processing the second metadata, wherein the first actions are different from the second actions.

18. The non-transitory computer readable medium of claim 16, wherein the backup comprises:

first backup data that was generated by the first application hosted by the new virtual machine; and second backup data that was generated by a second application hosted by the new virtual machine.

19. The non-transitory computer readable medium of claim 15, wherein providing the search services for the backup using the backup data processing schema compliant catalog data comprises:

updating a backup data catalog using the backup data processing schema compliant catalog data to obtain an updated backup data catalog, wherein the backup data catalog is associated with a plurality of backups that comprises the backup, and wherein the plurality of backups is stored in backup storage;

obtaining a request for a portion of the backup;

searching the plurality of backups using the backup data catalog for the portion of the backup to obtain a search result; and providing the search result in response to the request for the portion of the backup.

20. The non-transitory computer readable medium of claim 19, wherein the plurality of backups is stored in a format that is not natively searchable.

* * * * *